(12) United States Patent
Strodtbeck et al.

(10) Patent No.: US 6,335,920 B1
(45) Date of Patent: Jan. 1, 2002

(54) SATELLITE-BASED MEASUREMENT FOR UPLINK POWER CONTROL AND TIME SYNCHRONIZATION

(75) Inventors: Andrew L. Strodtbeck, El Segundo; Jennifer L. Vollbrecht, Torrance; Denise A. Uyeda, El Segundo, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/106,649

(22) Filed: Jun. 29, 1998

(51) Int. Cl.$^7$ ................................................ H04B 7/185
(52) U.S. Cl. .................... 370/318; 370/332; 455/522
(58) Field of Search .................... 370/331, 332, 370/333, 335, 342, 318, 252, 527; 455/12.1, 13.4, 69, 522, 510, 517, 10; 375/130, 211

(56) References Cited

U.S. PATENT DOCUMENTS

| | | | |
|---|---|---|---|
| 4,941,199 A | * 7/1990 | Saam | 455/10 |
| 5,333,175 A | * 7/1994 | Ariyavisitakul | 379/58 |
| 5,864,547 A | * 1/1999 | Strodbeck | 370/318 |
| 5,956,619 A | * 9/1999 | Gallagher | 455/12.1 |
| 5,963,865 A | * 10/1999 | Desgagne | 455/450 |
| 6,085,067 A | * 7/2000 | Gallagher | 455/13.1 |
| 6,097,752 A | * 8/2000 | Wiedeman | 375/200 |
| 6,175,744 B1 | * 1/2001 | Esmailzadeh | 455/522 |

* cited by examiner

Primary Examiner—Douglas Olms
Assistant Examiner—Ricardo M. Pizarro
(74) Attorney, Agent, or Firm—Michael W. Sales; Vijayalakshmi D. Duraiswamy

(57) ABSTRACT

A method for uplink power control and time synchronization in a satellite communications system that is achieved using satellite-based measurements of the uplink signal power and signal arrival time. Uplink signals transmitted from an originating terminal are received by a communications satellite which measures the received signal power and arrival time. The satellite transmits a downlink signal to the originating terminal containing information of the measured uplink signal power and arrival time. The originating terminal receives the downlink signal and transmits subsequent uplink signals with an uplink signal power and transmission timing based on the information transmitted by the satellite.

15 Claims, 3 Drawing Sheets

SATELLITE-BASED MEASUREMENT FOR UPLINK POWER CONTROL AND TIME SYNCHRONIZATION

BACKGROUND OF THE INVENTION

1. Field of the Invention

The present invention relates generally to satellite communications and, more particularly, to uplink power control and time synchronization in a two-way satellite communications system incorporating multiple simultaneous uplink ground terminals.

2. Description of Related Art

Communication satellites have the capability of receiving uplink signals from earth-based terminals, amplifying and translating the uplink signals into downlink signals, and retransmitting the downlink signals to receiving terminals. Such communications systems permit two types of communications. In a typical broadcast system, such as for distributing television programming, an uplink signal from a single broadcast transmitter is retransmitted by the satellite for simultaneous reception by multiple receiving terminals. In two-way systems, such as for normal telecommunications, uplink signals from many uplinking terminals are transmitted with no central coordination to a single satellite. Each uplink signal is addressed to and retransmitted for reception by one or more receiving terminals. Both types of systems permit concurrent receipt and processing of multiple uplink signals.

The satellites in both broadcast and two-way systems are capable of receiving uplink signals from multiple terminals using time-division multiple access (TDMA), frequency-division multiple access (FDMA) or a combination of the two access methods. In TDMA, each terminal uses the entire uplink bandwidth for a portion of the time. A synchronization arrangement which controls the time of transmission of each terminal is required. In an ideal situation, each terminal transmits uplink signals that arrive at the allotted time without overlap or gaps. Unfortunately, in the real world terminals sometimes transmit TDMA uplink signals that overstep their allotted time slot, thereby jamming the signals of other terminals. In these cases, the relative transmission timing for the offending terminals must be controlled to ensure the uplink signals arrive in the proper time slot.

In FDMA, the uplink bandwidth is subdivided and portions are assigned to different terminals. Power levels of the uplink signals must be controlled to reduce interference between the subdivisions. An FDMA uplink signal will leak, due to hardware imperfections, into the adjoining frequency bandwidth subdivision. If the uplink signal has too much power, the FDMA leakage will jam the adjoining subdivision. In this case, the relative signal powers of the uplink signals in adjoining subdivisions must be adjusted to minimize interference due to signal leakage.

In a broadcast satellite communications system, transmission stations transmit to a satellite uplink signals which are broadcast and simultaneously received by multiple receiver stations. The transmission station transmits an uplink signal at a predetermined uplink frequency to an orbiting satellite. The satellite receives the uplink signal and upconverts or downconverts the uplink signal to a downlink signal at a predetermined downlink frequency. The downlink signal is then retransmitted in a broadcast beam for simultaneous reception by multiple receiver stations. Typically, the transmission station is within the area encompassed by the broadcast beam and, therefore, is capable of receiving the downlink signal.

In broadcast systems as described, uplink power control and time synchronization can be performed at the transmission station. Power control is typically performed by the transmission station measuring the power of a beacon or a communications carrier signal in the broadcast beam from the satellite. The beacon or signal is transmitted with a predetermined power in either the uplink frequency band or the downlink frequency band. The transmission station measures the power of the received beacon or signal, and determines whether the uplink signal power should be adjusted to allow for variations in signal fade and interference at the uplink signal frequency. In these systems, the uplink signal powers can be increased or decreased as is necessary to overcome signal fade because the uplink signals from one transmission station do not interfere with the uplink signals of the other transmission stations of the system.

Time synchronization in broadcast satellite communications systems and systems having central coordination of uplink signal transmissions is usually performed by the transmission station measuring its own transmission as it appears in the downlink signal. The timing relationship between the uplink signal and the downlink signal is constant as the uplink signal is received, converted to the downlink signal, amplified and retransmitted by the satellite. Therefore, the time of receipt of the downlink signal at the transmission station can be used to adjust the transmission time of the uplink signal to ensure that the uplink signal arrives at the satellite at the allotted time.

Previous alternatives for uplink power control and timing synchronization are not applicable in the uncoordinated two-way systems as described herein. Specifically, the two-way system described herein interconnects multiple, geographically disparate spot beam coverage areas with a regenerative satellite payload and no centralized control station. The payload demodulates uplink signals into their constituent packetized bit streams and routes the packets to the downlink spotbeam(s) specified within the packet header. Thus, the originating terminal may or may not receive the downlink manifestation of the uplink signal. Moreover, both the timing and the signal-to-noise ratio of the uplink signal are removed by the demodulation and routing operations. Demodulation reduces the signal to the binary information stream, and routing introduces random queuing delays. Thus, neither the timing nor the received signal strength is discernible from the downlinked data.

Another problem exists in systems where low power uplink terminals are used to reduce size, cost and power consumption. In these systems, the uplink terminals cannot indiscriminately increase their uplink signal power to compensate for other uplink signals that leak into their subdivisions. Even in systems with uplink terminals capable of transmitting signals with higher uplink signal powers, the terminals cannot indescriminantly increase their uplink signal power lest system runaway occur. Consequently, a power control strategy is necessary in systems without central coordinated uplinks and using either low power or high power uplink terminals wherein the terminals are self-policing and each control their own uplink signal power.

For these reasons, a need exists for a method for satellite-based uplink power control and time synchronization in satellite communications systems.

SUMMARY OF THE INVENTION

The present invention is directed to a method for uplink power control and time synchronization that is achieved using satellite based measurements of uplink signal power and signal arrival time.

According to one aspect of the present invention, the uplink signal power at an originating terminal is adjusted based on uplink signal power measured at a satellite in a satellite communications system. The originating terminal transmits an uplink signal with a first uplink signal power. The satellite receives the uplink signal, measures the received uplink signal power, and transmits information of the received uplink signal power back to the originating terminal. The originating terminal receives the information of the received uplink signal power and transmits subsequent uplink signals at a second transmitted uplink signal power determined based on the information transmitted by the satellite.

Adjustment of the uplink signal power may be performed continuously as the uplink signals are received at the satellite. Alternatively, uplink signal power adjustments may be triggered by the occurrence of an event, such as the transmission of a measurement request from the originating terminal to the satellite. Additionally, the processing capability for determining an adjusted uplink signal power can reside either at the satellite or at each of the originating uplink terminals.

According to another aspect of the present invention, the transmission timing for uplink signals from an originating terminal is adjusted based on the uplink signal arrival time at a satellite in a satellite communications system. The originating terminal transmits an uplink signal at a predetermined time according to a first uplink signal transmission timing pattern. The satellite receives the uplink signal, determines the uplink signal arrival time, and transmits information of the uplink signal arrival time back to the originating terminal. The originating terminal receives the information of the uplink signal arrival time and transmits subsequent uplink signals according to a second uplink signal transmission timing pattern determined based on the information transmitted by the satellite.

Adjustment of the uplink signal transmission timing pattern may be performed continuously as the uplink signals are received at the satellite. Alternatively, transmission timing pattern adjustments may be triggered by the occurrence of an event, such as the transmission of a request from the originating terminal to the satellite. Additionally, the processing capability for determining an adjusted uplink signal transmission timing pattern can reside either at the satellite or at each of the originating uplink terminals.

According to a still further aspect of the present invention, adjustment of both the uplink signal power and the uplink signal transmission timing pattern at an originating terminal occur at the same time based on the received uplink signal power and arrival time of a given uplink signal. Additionally, the present invention as described herein is directed to use in TDMA-packet switching satellite systems, but its application is not limited to use solely in the satellite systems discussed herein which are intended to be illustrative only and not to be limiting on the invention.

The present invention may best be understood with reference to the following description when considered with the accompanying drawings.

DETAILED DESCRIPTION OF THE PREFERRED EMBODIMENTS

Figure 1:
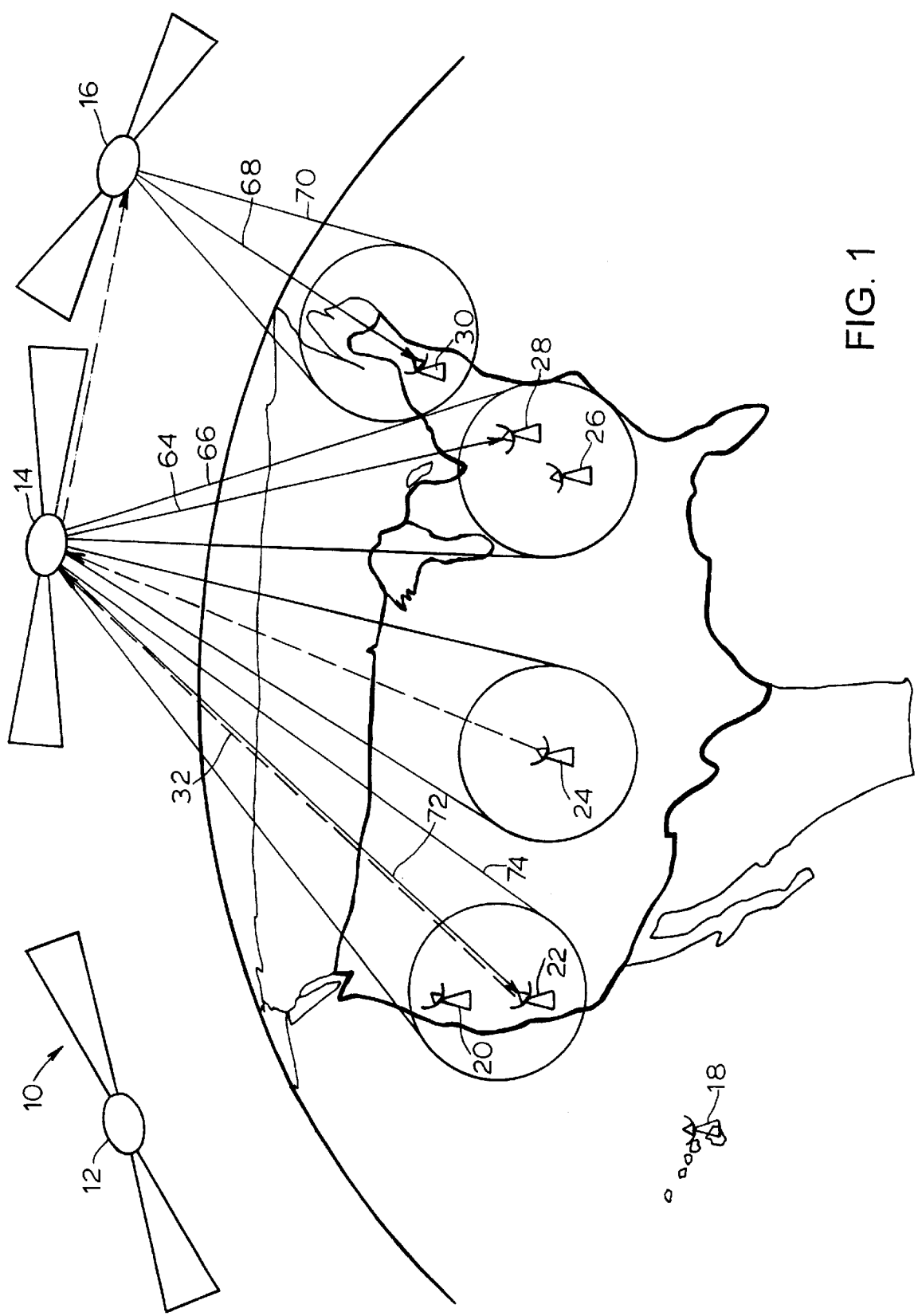
FIG. 1 is a diagram of a two-way satellite communications system capable of implementing the present invention.
Figure 2:
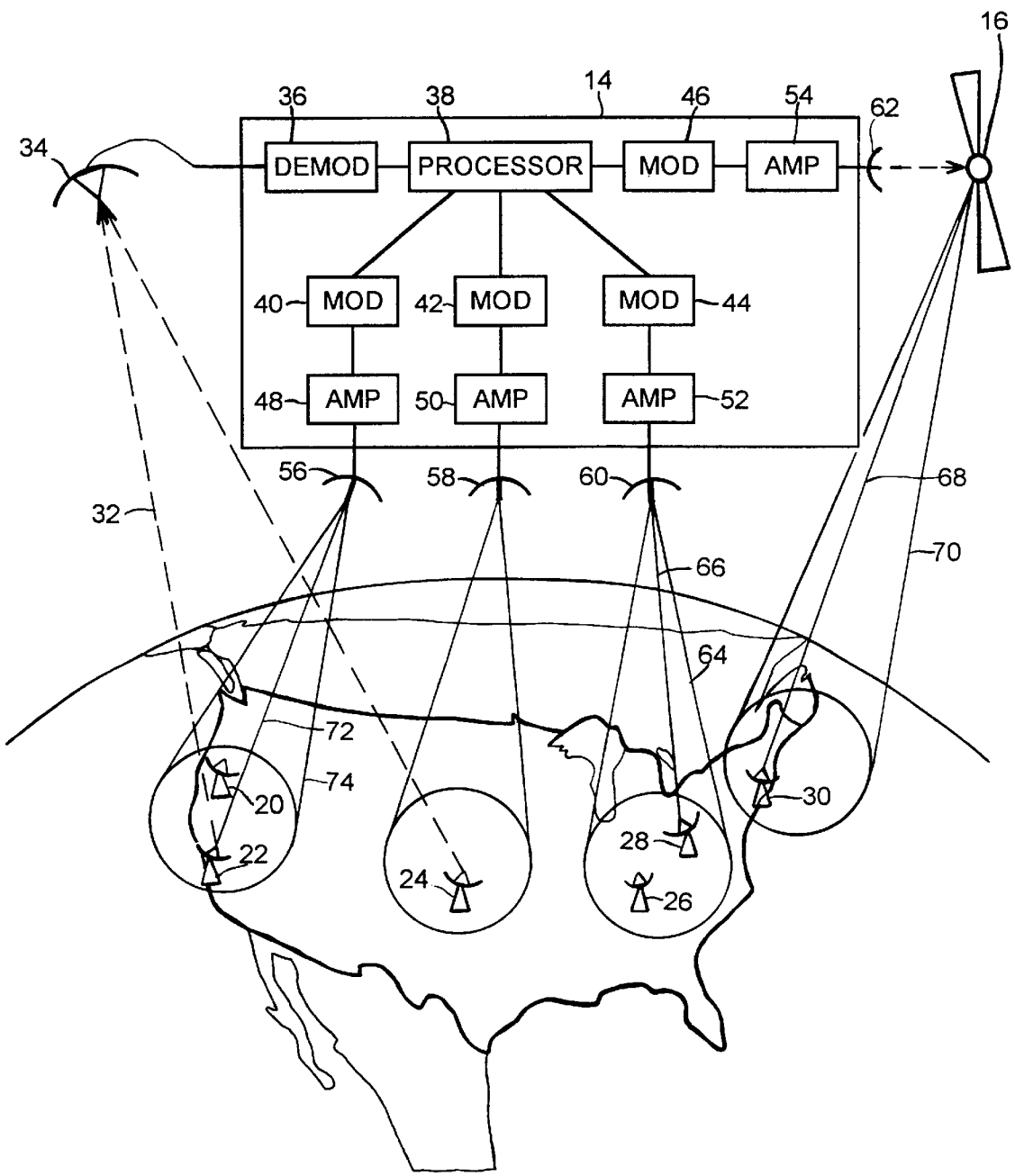
FIG. 2 is a diagram of the two-way satellite communications system of FIG. 1 including a block diagram of two-way communication satellite.
Figure 3:
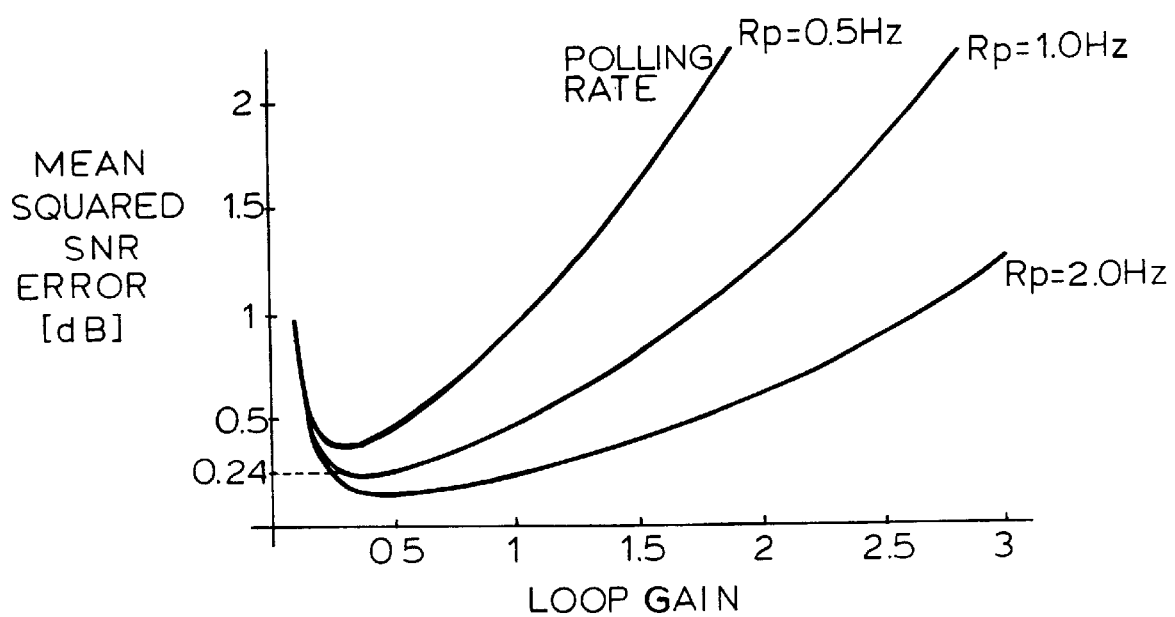
FIG. 3 is a chart depicting optimization curves for loop gain versus mean squared SNR error for varying polling rates in an uplink power control system implementing the method of the present invention.

Systems are currently being developed which allow satellite communications between many geographically dispersed uplink terminals with no central coordination using digital data packets. One example of such a system is illustrated in FIGS. 1 and 2. A communications system 10 is comprised of a network of one or more satellites 12–16 which services many earth-based terminals 18–30, and allows one terminal, such as terminal 22, to communicate directly with a second terminal, terminal 28, by transmitting a series of data packets specifically addressed to the second terminal 28. Each satellite 12–16 has the ability to receive uplink signals containing digital data packets from originating terminals and determine the target terminals to which the data packets are addressed. The satellites then route the data packets to a transmitter designated to transmit a downlink signal to the target terminal in a spot beam.

In the communications system 10, an originating terminal 22 creates a data packet containing header information identifying a target terminal 28 to which the information is addressed, and a payload of digital data. The originating terminal 22 modulates the data packet onto an uplink carrier frequency to created an uplink signal 32 which is transmitted to a satellite 14 within the system 10. The satellite 14 receives the uplink signal 32 at a receiving antenna 34, and demodulator 36 demodulates the uplink signal 32 and converts the uplink signal 32 back into digital data. A processor 38 identifies the target terminal 28 from the header information and routes the data packet for transmission to the target terminal 28.

The data packets must be reconverted into a transmittable downlink signal for transmission to the target terminal. The processor 38 routes the data packet to the appropriate modulators 40–46 which modulate the data packets onto the downlink carrier frequency to create the downlink signals. The downlink signals are amplified by amplifiers 48–54 and retransmitted to the target terminals in spot beams by transmitters 56–62. In the present example, data packets addressed to target terminal 28 are routed to modulator 44, amplifier 52 and transmitter 60, thereby creating and transmitting downlink signal 64 in spot beam 66.

Data packet routing may include hand-offs of the data packets to other satellites 12, 16 within the system 10 that service the target terminals. For example, data transmitted from terminal 24 to terminal 30 would require an inter-satellite hand-off. Processor 38 of satellite 14 routes the data packets from terminal 24 to modulator 46, amplifier 54 and transmitter 62 for transmission to satellite 16. The processor for satellite 16 then routes the data packets to an on-board modulator, amplifier and transmitter for retransmission to terminal 30.

At the target terminal 28, the downlink signal 64 is demodulated and converted to digital data. The target terminal 28 only processes the data packets addressed to that particular terminal. Terminal 28 discards data packets addressed to other terminals, such as terminal 26, which are serviced by the spot beam 66.

The system illustrated in FIGS. 1 and 2 allows a first terminal to send messages made up of a series of digital data packets directly to a second terminal. In such a system, uplink power control and time synchronization can be accomplished with satellite-based measurements. In a first embodiment of the present invention, a terminal polls the satellite, requesting information of the uplink signal power and the transmission timing. Terminal 22 transmits a data packet in the uplink signal 32 which contains a measurement request for the satellite 14. The data packet has a "self-addressed" format which specifies terminal 22 as the target terminal for the downlink signal 72.

The uplink signal 32 is received by the antenna 34 and transferred to demodulator 36. Demodulator 36 demodulates the uplink signal 32 and converts the signal back into digital data. Demodulator 36 also measures the uplink signal power and the arrival time of the uplink signal 32. Processor 38 determines from the header information in the data packet that the packet is addressed to terminal 22 and that terminal 22 is requesting information of the measured power and arrival time of the uplink signal. Processor 38 responds to the measurement request in the data packet by adding the information to the data packet and routing the data packet to modulator 40, amplifier 48 and transmitter 56 for transmission to terminal 22 in the downlink signal 72 in spot beam 74. The terminal 22 receives the downlink signal 72 and determines that the data packet is addressed to the terminal 22. The terminal 22 adjusts the uplink signal power, the transmission timing, or both as dictated by the information in the data packet.

Parameters of a power control algorithm determine how the terminal will make the power and timing adjustments. However, the scope of the present invention is not limited to the use of a particular algorithm. Additionally, the location of execution of the power control algorithm is not critical to the method of the present invention. Execution could occur within the satellite 14 at the processor 38. In this case, the processor 38 could format the data packet with the adjusted power level and transmission timing, or with some intermediate information which is used by the terminal 22 to arrive at the adjusted values. Conversely, the processor 38 could format the data packet with the raw data of the uplink power and arrival time, with execution of the algorithm occurring at the terminal 22. Other methods of implementing a power control and timing synchronization algorithm are contemplated by the present invention and will be obvious to those of ordinary skill in the art.

In another embodiment of the present invention, power control and time synchronization occur continuously as uplink signals are received by the satellite. In this embodiment, each uplink data packet contains address information identifying the originating terminal. The demodulator 36 measures the uplink power and arrival time of every uplink signal and the processor 38 formats a new data packet with the address of the originating terminal and information of the measured uplink power and arrival time. The processor 38 then routes the new data packet to the appropriate spot beam. This embodiment has the advantage that no conditional action is necessary to respond to a change in the link environment on the part of either the satellite or the terminal.

In another alternative embodiment, the satellite evaluates the power and timing measurements to determine how and when a terminal should adjust the uplink signal power and transmission timing. If adjustment is necessary, the satellite directly commands the terminal to adjust the power level, transmission timing, or both by formatting and transmitting a new data packet. In this embodiment, the satellite only formats and transmits new data packets for a given terminal when an adjustment is necessary.

The method of the present invention exploits the processing already required on-board the satellite to generate the required measurements which are reformatted and transmitted to the originating terminal. The satellite demodulator measures both the power level and the time of arrival of the uplink signal. The terminal filters the satellite-supplied data to adjust the uplink power and transmission timing. This assures a high quality link in two respects. First, it adapts transmit power to changing fades while keeping interference on other links to a minimum. Second, it adapts uplink signal transmission time to changing satellite range, allowing a tight guard time for high throughput efficiency.

Computer simulations using measured Ka-band (27–31 GHz uplink, 17–21 GHz downlink) rain fade events have shown that acceptable power control and time synchronization can be achieved with a worst-case uplink polling rate of twice per second. FIG. 5 shows a loop gain optimization for a fade rate of 0.16 dB/second. The loop gain corresponds to the weight given to the most recent measurements when adjusting the uplink power and transmission timing. The mean squared signal-to-noise ratio (SNR) error represents the deviation of the uplink power measured at the satellite from the optimal power level. In these simulations, the SNR estimate was formed over a 32 chip burst preamble. Polling rates of 0.5, 1.0, and 2.0 Hz are shown. As can be seen, tracking accuracies of better than 0.5 dB can be achieved when the loop gain is optimized.

While the present invention has been described with reference to specific examples, which are intended to be illustrative only and not to be limiting of the invention, it will be apparent to those of ordinary skill in the art that changes, additions, and/or deletions may be made to the disclosed embodiments without departing from the spirit and scope of the invention.

What is claimed is:

1. A method of adjusting an uplink signal power of a terminal in a satellite communications system, the method comprising the steps of:

transmitting an uplink signal from an originating terminal to a satellite, the uplink signal being transmitted with a first transmitted uplink signal power, the uplink signal having a data packet containing information identifying the originating terminal;

receiving the uplink signal at the satellite, the uplink signal received with a received uplink signal power;

demodulating the received uplink signal and measuring the received uplink signal power at the satellite;

creating a downlink data packet for transmission to the originating terminal, the downlink data packet containing the identification information from the uplink data packet and the information of the received uplink signal power;

transmitting information of the received uplink signal power from the satellite to the originating terminal in a downlink signal, the downlink signal having a data packet containing information identifying the originating terminal;

receiving the downlink signal at the originating terminal; and transmitting subsequent uplink signals with a second transmitted uplink signal power, the second transmitted uplink signal power being determined based on the transmitted information of the received uplink signal power.

2. The method of claim 1 wherein the uplink signal contains a measurement request causing the satellite to transmit information of the received uplink power signal to the originating terminal.

3. The method of claim 1, wherein the creating step further comprises the step of adding identification information and information of the received uplink signal power to an existing data packet.

4. The method of claim 1, wherein the step of creating the downlink data packet further comprises the step of calculating the second transmitted uplink signal power, wherein the information of the received uplink signal comprises the calculated second transmitted uplink signal power.

5. The method of claim 1, wherein the step of transmitting information of the received uplink signal power further comprises the step of routing the downlink data packet to a transmitter designated for transmitting downlink signals to the originating terminal.

6. The method of claim 5, wherein the designated transmitter transmits a spot beam on a geographic area encompassing the originating terminal.

7. The method of claim 1 wherein the step of measuring the power level is performed continuously and automatically by the satellite.

8. A method of adjusting a transmission timing of an uplink signal of a terminal in a satellite communications systems comprising the steps of:

transmitting an uplink signal from an originating terminal to a satellite, the uplink signal being transmitted according to a first uplink signal transmission timing pattern, the uplink signal having a data packet containing information identifying the originating terminal;

receiving the uplink signal at the satellite, the uplink signal received at an uplink signal arrival time;

demodulating the received uplink signal and measuring the uplink signal arrival time at the satellite;

creating a downlink data packet for transmission to the originating terminal, the downlink data packet containing the identification information from the uplink data packet and the information of the uplink signal arrival time;

transmitting timing information of the uplink signal arrival time from the satellite to the originating terminal in a downlink signal, the downlink signal having a data packet containing information identifying the originating terminal;

receiving the downlink signal at the originating terminal; and transmitting subsequent uplink signals according to a second uplink signal transmission timing pattern, the second uplink signal transmission timing pattern being determined based on the transmitted timing information.

9. The method of claim 8 wherein the uplink signal contains a measurement request causing the satellite to transmit information of the received uplink power signal to the originating terminal.

10. The method of claim 8, wherein the creating step further comprises the step of adding identification information and information of the received uplink signal arrival time to an existing data packet.

11. The method of claim 8, wherein the step of creating the downlink data packet further comprises the step of calculating the second uplink signal transmission timing-pattern, wherein the information of the uplink signal arrival time comprises the calculated second uplink signal transmission timing pattern.

12. The method of claim 8, wherein the step of transmitting information of the uplink signal arrival time further comprises the step of routing the downlink data packet to a transmitter designated for transmitting downlink signals to the originating terminal.

13. The method of claim 12, wherein the designated transmitter transmits a spot beam on a geographic area encompassing the originating terminal.

14. The method of claim 8 wherein the step of measuring the uplink signal arrival time is performed continuously and automatically by the satellite.

15. A method of adjusting an uplink signal power and a transmission timing of a terminal in a satellite communications system, the method comprising the steps of:

transmitting an uplink signal from an originating terminal to a satellite, the uplink signal being transmitted with a first transmitted uplink signal power and transmitted according to a first uplink signal transmission timing pattern;

receiving the uplink signal at the satellite, the uplink signal received with a received uplink signal power and received at an uplink signal arrival time;

measuring the received uplink signal power at the satellite;

determining at the satellite the uplink signal arrival time;

transmitting information of the received uplink signal power and the uplink signal arrival time from the satellite to the originating terminal in a downlink signal;

receiving the downlink signal at the originating terminal; and transmitting subsequent uplink signals with a second transmitted uplink signal power and according to a second uplink signal transmission timing pattern, the second transmitted uplink signal power being determined based on the transmitted information of the received uplink signal power and the second uplink signal transmission timing pattern determined based on the transmitted timing information.

* * * * *